(12) United States Patent
Lee et al.

(10) Patent No.: US 11,651,114 B2
(45) Date of Patent: May 16, 2023

(54) METHOD AND APPARATUS FOR DESIGNING A MAGNETIC PLATE

(71) Applicant: Ulsan National Institute of Science and Technology, Ulsan (KR)

(72) Inventors: Ki-Suk Lee, Ulsan (KR); Daehan Jeong, Ulsan (KR); Hee Sung Han, Ulsan (KR); Namkyu Kim, Ulsan (KR); Myeonghwan Kang, Ulsan (KR)

(73) Assignee: Ulsan National Institute of Science and Technology, Ulsan (KR)

( * ) Notice: Subject to any disclaimer, the term of this patent is extended or adjusted under 35 U.S.C. 154(b) by 399 days.

(21) Appl. No.: 16/919,266

(22) Filed: Jul. 2, 2020

(65) Prior Publication Data

US 2021/0004506 A1 Jan. 7, 2021

(30) Foreign Application Priority Data

Jul. 4, 2019 (KR) .................. 10-2019-0080870

(51) Int. Cl.
*G06F 30/10* (2020.01)
*G06F 30/27* (2020.01)
*H01F 41/24* (2006.01)
*G06F 119/14* (2020.01)

(52) U.S. Cl.
CPC .............. *G06F 30/10* (2020.01); *G06F 30/27* (2020.01); *H01F 41/24* (2013.01); *G06F 2119/14* (2020.01)

(58) Field of Classification Search
CPC .......... G06F 30/00; G06F 30/10; G06F 30/27; G06F 2119/14; G06F 30/17; H01F 41/24; H01F 41/16; G06N 20/00

USPC ............................................................ 703/1
See application file for complete search history.

(56) References Cited

FOREIGN PATENT DOCUMENTS

| JP | 2015-135901 A | 7/2015 |
|----|---------------|--------|
| KR | 10-1881037 B1 | 7/2018 |
| KR | 101881037 B1 * | 7/2018 |

(Continued)

OTHER PUBLICATIONS

Malic, L. et al., "Polymer-based Microfluidic Chip for Rapid and Efficient Immunomagnetic Capture and Release of Listeria Monocytogenes", Aug. 28, 2015, Lab on a Chip: Minaturisation for Chemistry, Physics, Biology, Materials Science and Bioengineering, The Royal Society of Chemistry. (Year: 2015).*

*Primary Examiner* — Cedric Johnson
(74) *Attorney, Agent, or Firm* — Maier & Maier, PLLC (57) ABSTRACT

A method for designing a magnetic plate allowing magnetic particles contained in magnetic ink distributed at different densities includes estimating a distribution of the magnetic particles allowing the magnetic ink to be spread, estimating forms of magnetic field applying the magnetic force to the magnetic particles in order for the magnetic ink to be spread in a desired magnetic printing pattern within the printing layer, obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate and obtaining a parameter for the magnetic plate configured to form the magnetic printing pattern based on the obtained adjustment factors.

7 Claims, 4 Drawing Sheets

(56) References Cited

FOREIGN PATENT DOCUMENTS

KR         10-1936777 B1     1/2019
KR         101936777 B1 *     1/2019

\* cited by examiner

METHOD AND APPARATUS FOR DESIGNING A MAGNETIC PLATE

CROSS-REFERENCE TO RELATED APPLICATIONS

This application is based on and claims priority from Korean Patent Application No. 10-2019-0080870, filed on Jul. 4, 2019, the disclosure of which is incorporated herein in its entirety by reference for all purposes.

FIELD

The present disclosure relates to a method and apparatus for designing a magnetic plate; and, more particularly, to the method and apparatus for designing a magnetic plate, providing magnetic force allowing magnetic particles contained in magnetic ink to be spread in a desired magnetic printing pattern.

BACKGROUND

In general, magnetic printing may be implemented by using a point that the magnetic particles contained in the magnetic ink are distributed at different densities depending on magnetic force intensity and it is necessary to adjust the magnetic force intensity of the magnetic plate in order for the magnetic ink to be spread in the desired magnetic printing pattern.

"pattern formation method using magnetic ink and a magnetic force" is disclosed on the Korean Patent No. 10-1881037 (issued date: Jul. 17, 2018) as a related art regarding a formation of the magnetic printing pattern. According to the pattern formation method disclosed on the related art, an upper surface of the magnetic plate made of a permanent magnet is etched to a shape of desired irregularities in order to provide the magnetic force forming the desired magnetic printing pattern at a printing layer which is disposed on the upper surface of the magnetic plate.

According to the related art, when designing the magnetic plate having the shape of desired irregularities corresponding to the magnetic printing pattern, it relies on an inductive method observing what the magnetic printing pattern is formed by the magnetic ink, and how it is changed while making certain irregularities on the upper surface of the magnetic plate and changing these. In terms of cost, excessive spending occurred since the method for designing the magnetic plate using the inductive method takes a long time to design as well as it is accompanied by frequent design changes.

SUMMARY

The drawbacks according to embodiments of the present disclosure provide a method and apparatus for designing a magnetic plate obtaining a parameter for the magnetic plate capable of forming a desired magnetic printing pattern by using a model for which deep learning or machine learning has been performed so that the method and apparatus may reduce time and cost required to design the magnetic plate.

The drawbacks of the present disclosure are not limited to the aforementioned drawbacks, and other drawbacks that have not been mentioned can be clearly understood by those skilled in the art from the following description.

In accordance with a first aspect of the present disclosure, there is provided a method, using an apparatus, for designing a magnetic plate allowing magnetic particles contained in magnetic ink within a printing layer disposed on the magnetic plate to be distributed at different densities depending on magnetic force intensity of the magnetic plate, comprising estimating a distribution of the magnetic particles allowing the magnetic ink to be spread, estimating forms of magnetic field applying the magnetic force to the magnetic particles in order for the magnetic ink to be spread in a desired magnetic printing pattern within the printing layer, obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate and obtaining a parameter for the magnetic plate configured to form the magnetic printing pattern based on the obtained adjustment factors.

The adjustment factors of the magnetic plate contain factors influencing a magnetic domain structure of the magnetic plate corresponding to the magnetization property of the magnetic plate, and the factors influencing the magnetic domain structure have at least one of an external magnetic field, temperature, mechanical stress and electromagnetic waves.

Training the model with the deep learning or the machine learning by using data sets including the magnetization property of the magnetic plate, defined as an input, and the factors influencing the magnetic domain structure, defined as an output.

The adjustment factors of the magnetic plate contain material properties and shapes depending on a material of the magnetic plate influencing the upper surface structure of the magnetic plate, and the material properties have at least one of exchange stiffness constant, crystal anisotropy constant, saturation magnetization and Dzyaloshinskii-moriya constant.

Training the model with the deep learning or the machine learning by using data sets including the upper surface structure of the magnetic plate, defined as an input, and the material properties and the shapes depending on the material of the magnetic plate, defined as an output.

In accordance with a second aspect of the present disclosure, there is provided a non-transitory computer-readable recording medium storing a program causing a computer to perform a method, using an apparatus, for designing a magnetic plate allowing magnetic particles contained in magnetic ink within a printing layer disposed on the magnetic plate to be distributed at different densities depending on magnetic force intensity of the magnetic plate, the method comprising estimating a distribution of the magnetic particles allowing the magnetic ink to be spread, estimating forms of magnetic field applying the magnetic force to the magnetic particles in order for the magnetic ink to be spread in a desired magnetic printing pattern within the printing layer, obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate and obtaining a parameter for the magnetic plate configured to form the magnetic printing pattern based on the obtained adjustment factors.

In accordance with a third aspect of the present disclosure, there is provided an apparatus for designing a magnetic plate allowing magnetic particles contained in magnetic ink within a printing layer disposed on the magnetic plate to be distributed at different densities depending on magnetic force intensity of the magnetic plate, comprising an input unit configured to receive information regarding a desired magnetic printing pattern to which the magnetic ink is formed and a control unit configured to estimate a distribution of the magnetic particles allowing the magnetic ink to be spread, to estimate forms of magnetic field applying the magnetic force to the magnetic particles in order for the magnetic ink to be spread in the desired magnetic printing pattern within the printing layer, to obtain adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate and to obtain a parameter for the magnetic plate configured to form the magnetic printing pattern based on the obtained adjustment factors.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

The present disclosure is a method and apparatus for designing a magnetic plate, and the magnetic plate according to one embodiment of the present disclosure allows magnetic particles contained in magnetic ink of a printing layer disposed on the magnetic plate to be distributed at different densities depending on magnetic force intensity of the magnetic plate so that a magnetic printing is implemented.

Figure 1:
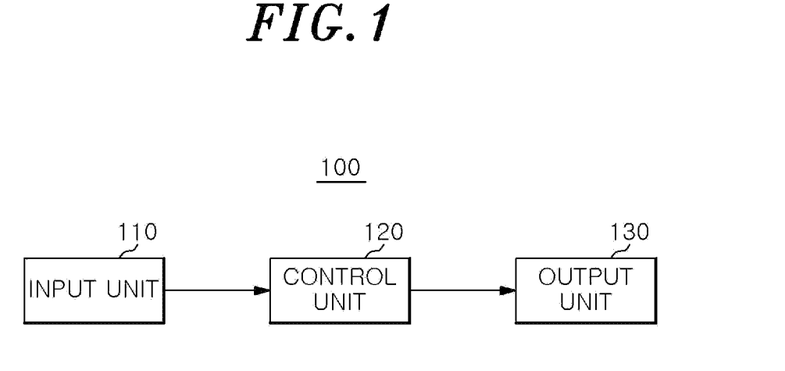
FIG. 1 is a block diagram of an apparatus for designing a magnetic plate according to one embodiment of the present disclosure.

FIG. 1 is a block diagram of the apparatus for designing the magnetic plate according to a first embodiment of the present disclosure.

The apparatus for designing the magnetic plate 100 includes an input unit 110, a control unit 120 and an output unit 130, which is shown in FIG. 1

The input unit 110 receives information regarding a desired magnetic printing pattern in which the magnetic ink of the printing layer disposed on the magnetic plate is spread.

The control unit 120 obtains a parameter for the magnetic plate which may allow the magnetic ink of the printing layer to be spread in the desired magnetic printing pattern and provides the output unit 130 with information regarding the obtained parameter.

The control unit 120 may obtain the parameter for the magnetic plate capable of forming the magnetic printing pattern by using deep learning model or machine learning model.

The control unit 120 may estimate a distribution of the magnetic particles allowing the magnetic ink to be spread, and estimate forms of magnetic field applying the magnetic force to the magnetic particles in order for the magnetic ink to be spread in the desired magnetic printing pattern within the printing layer, and obtain adjustment factors of the magnetic plate corresponding to the estimated forms of the magnetic field by using a model for which deep learning or machine learning has been performed using design conditions including at least one of an upper surface structure and a magnetization property of the magnetic plate.

The output unit 130 may process information regarding the parameter for the magnetic plate received from the control unit 120 in a form that can be recognizable by a user and output the information. Also, the output unit 130 may process information regarding the parameter in a form capable of calculating and provide other information processing devices with the information.

Figure 2:
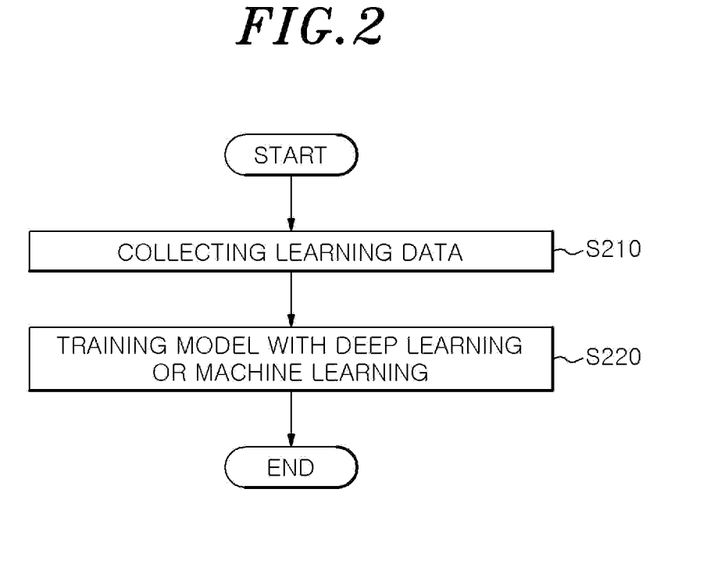
FIG. 2 is a flowchart to explain a learning process by a method for designing the magnetic plate performed by the apparatus for designing the magnetic plate according to one embodiment of the present disclosure.
Figure 3:
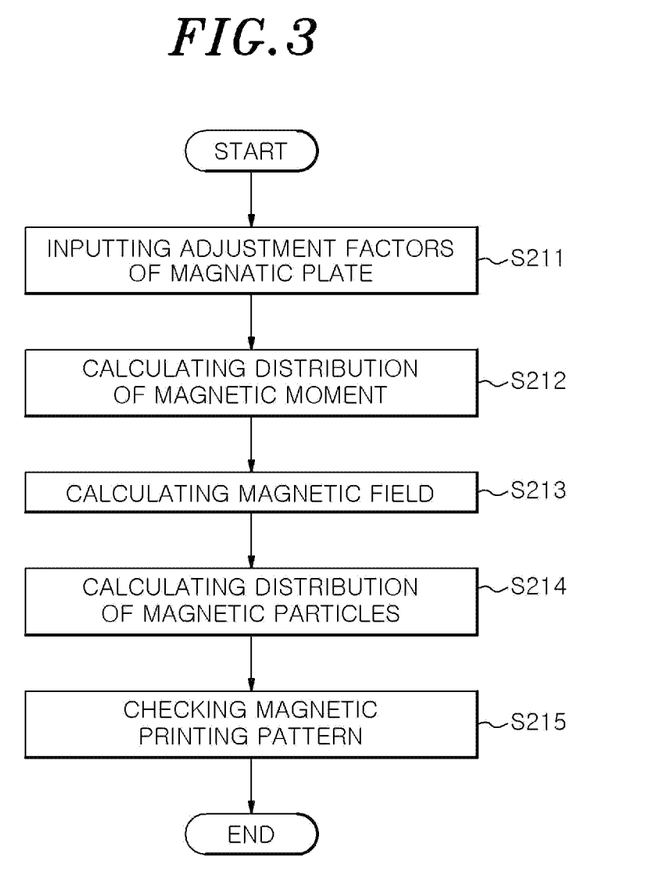
FIG. 3 is a flowchart to explain a process of collecting data and training model by the method for designing the magnetic plate performed by the apparatus for designing the magnetic plate according to one embodiment of the present disclosure.
Figure 4:
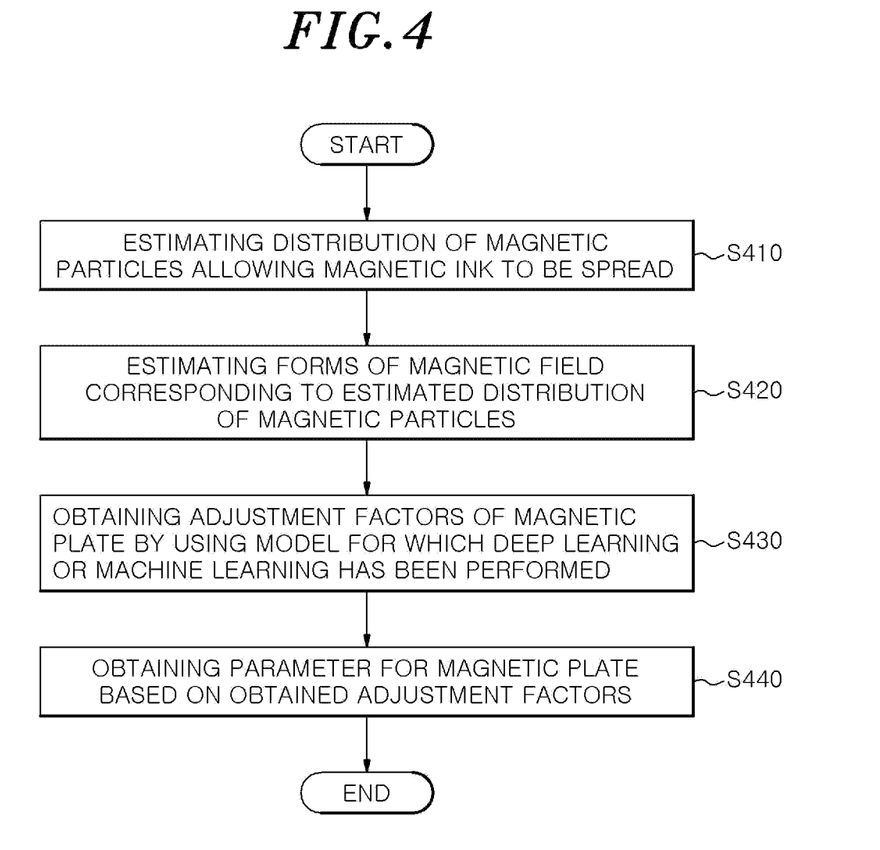
FIG. 4 is a flowchart to explain a process of obtaining a parameter for the magnetic plate by the method for designing the magnetic plate performed by the apparatus for designing the magnetic plate according to one embodiment of the present disclosure.

FIG. 2 is a flowchart to explain a learning process by a method for designing the magnetic plate performed by the apparatus for designing the magnetic plate 100 according to one embodiment of the present disclosure, FIG. 3 is a flowchart to explain a process of collecting data and training the model by the method for designing the magnetic plate performed by the apparatus for designing the magnetic plate 100 according to one embodiment of the present disclosure and FIG. 4 is a flowchart to explain a process of obtaining a parameter for the magnetic plate by the method for designing the magnetic plate performed by the apparatus for designing the magnetic plate 100 according to one embodiment of the present disclosure.

Hereinafter, the method of designing the magnetic plate performed by the apparatus for designing the magnetic plate 100 will be described in detail with reference to the accompanying FIGS. 1 to 4.

The apparatus for designing the magnetic plate 100 collects learning data for the model, which will be used to obtain the parameter for the magnetic plate prior to designing the magnetic plate S210, and trains the model with the deep learning or machine learning by using the collected learning data S220.

The model for which the deep learning or machine learning has been performed may be inputted to the apparatus for designing the magnetic plate 100 after a collection process of the learning data S210 and training process of the model S220 were performed by the control unit 120 or the information processing devices capable of calculating.

Describing the collection process of the learning data, adjustment factors are inputted by the user through the input unit 110 S211.

The magnetic force provided from the magnetic plate to allow the magnetic ink to be spread in the desired magnetic printing pattern, is changed depending on the upper surface structure or the magnetization property of the magnetic plate.

For example, the magnetic force allowing the magnetic ink to be spread in the desired magnetic printing pattern when the magnetic field is formed, may be provided to the magnetic plate.

For instance, adjustment factors influencing the magnetic domain structure for changing the magnetization property have at least one of an external magnetic field, temperature, mechanical stress and electromagnetic waves.

The magnetic force allowing the magnetic ink to be spread in the desired magnetic printing pattern may be provided to the magnetic plate when an array of irregularities corresponding to the magnetic substance disposed on the upper surface of the magnetic plate is made of so that the magnetic field is formed.

For example, adjustment factors influencing the upper surface structure of the magnetic plate may contain material properties depending on a material of the magnetic plate (exchange stiffness constant, crystal anisotropy constant, saturation magnetization, Dzyaloshinskii-moriya constant or the like), shapes (irregularities, a plate shape or the like) or the like.

The control unit 120 configured to calculate a spatial distribution of a magnetic moment by using a micromagnetic simulation. For example, a magnetic domain structure inside the magnetic plate is calculated S212. Furthermore, the control unit 120 configured to calculate the magnetic field provided from the magnetic moment based on the micromagnetic simulation. For example, the magnetic field which extends toward an outside of the magnetic plate, is calculated S213.

The control unit 120 configured to calculate the spatial distribution by the magnetic field of the magnetic particles contained in the magnetic ink of the printing layer disposed on the magnetic plate S214.

The magnetic printing pattern which is formed at the printing layer by the magnetic force applied by the magnetic field having the calculated spatial distribution, is checked. In other words, the information regarding magnetic printing pattern is inputted S215.

When processes of S211 to S215 are repeated so that results of the processes are sufficiently accumulated, the deep learning or machine learning has been performed regarding the model which will be used to obtain the parameter for the magnetic plate. It becomes possible to obtain back the adjustment factors, such as the irregularities or the magnetic domain, from the magnetic pattern by using the model for which the deep learning or machine learning has been performed.

The learning model in S220 may be trained with the deep learning or machine learning by using data sets including the magnetization property of the magnetic plate, defined as an input, and the factors influencing the magnetic domain structure, defined as an output. For example, the factors influencing the magnetic domain structure of the magnetic plate to change the magnetization property have at least one of the external magnetic field, the temperature, the mechanical stress and the electromagnetic waves.

Also, the leaning model may be trained with the deep learning or machine learning by using data sets including the upper surface structure of the magnetic plate, defined as an input, and the material properties and the shapes depending on the material of the magnetic plate, defined as an output. For example, the adjustment factors influencing an upper surface structure of the magnetic plate may contain material properties depending on a material of the magnetic plate (exchange stiffness constant, crystal anisotropy constant, saturation magnetization, Dzyaloshinskii-moriya constant or the like), shapes (irregularities, a plate shape or the like) or the like.

After the deep learning or machine learning is performed regarding the model as described above with reference to the accompanying FIGS. 2 and 3, the magnetic plate providing the magnetic force allowing the magnetic particles contained in the magnetic ink of the printing layer disposed on the magnetic plate to be spread in the desired magnetic printing pattern, may be designed.

The information regarding the desired magnetic printing pattern in which the magnetic ink is spread and the design conditions including the upper structure of the magnetic plate or the magnetization property, are inputted through the input unit 110. Herein, the inputted design conditions may correspond to the adjustment factors inputted through the S211.

Therefore, the control unit 120 estimates the distribution of the magnetic particles inputted through the input unit 110, allowing the magnetic ink to be spread in the magnetic printing pattern S410, and estimates the forms of magnetic field applying the magnetic force to the magnetic particles in order for the magnetic ink to be spread in the desired magnetic printing pattern S420.

The control unit 120 obtains the adjustment factors of the magnetic plate corresponding to the estimated forms of the magnetic field in S420 by using a model for which the deep learning or machine learning has been performed in S220 using the design conditions including the upper surface structure or the magnetization property of the magnetic plate S430.

Furthermore, the control unit 120 may obtain the parameter for the magnetic plate forming the magnetic printing pattern based on the adjustment factors, which is obtained in S430, S440.

To the next, the control unit 120 may control output unit 130 to process the information regarding the parameter for the magnetic plate in a form that can be recognizable by the user and to output the information. Also, the control unit 120 may process the information regarding the parameter in a form capable of calculating and provide other information processing devices with the information.

As described on the above, according to one embodiment of the present disclosure, not only the time required to design a magnetic plate is significantly reduced, but it also requires minimal cost due to obtaining the parameter for the magnetic plate capable of forming the magnetic printing pattern by using the model for which the deep learning or machine learning has been performed.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method, using an apparatus, for designing a magnetic plate allowing magnetic particles contained in magnetic ink within a printing layer disposed on the magnetic plate to be distributed at different densities depending on magnetic force intensity of the magnetic plate, the method comprising:
    estimating a distribution of the magnetic particles allowing the magnetic ink to be spread;
    estimating forms of magnetic field applying the magnetic force to the magnetic particles in order for the magnetic ink to be spread in a desired magnetic printing pattern within the printing layer;
    obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate; and
    obtaining a parameter for the magnetic plate configured to form the magnetic printing pattern based on the obtained adjustment factors.

2. The method of claim 1, wherein the adjustment factors of the magnetic plate contain factors influencing a magnetic domain structure of the magnetic plate corresponding to the magnetization property of the magnetic plate, and
    the factors influencing the magnetic domain structure have at least one of an external magnetic field, temperature, mechanical stress and electromagnetic waves.

3. The method of claim 2, further comprising:
    training the model with the deep learning or the machine learning by using data sets including the magnetization property of the magnetic plate, defined as an input, and the factors influencing the magnetic domain structure, defined as an output.

4. The method of claim 1, wherein the adjustment factors of the magnetic plate contain material properties and shapes depending on a material of the magnetic plate influencing the upper surface structure of the magnetic plate, and
    the material properties have at least one of exchange stiffness constant, crystal anisotropy constant, saturation magnetization and Dzyaloshinskii-moriya constant.

5. The method of claim 4, further comprising:
    training the model with the deep learning or the machine learning by using data sets including the upper surface structure of the magnetic plate, defined as an input, and the material properties and the shapes depending on the material of the magnetic plate, defined as an output.

6. A non-transitory computer-readable storage medium including computer executable instructions, wherein the instructions, when executed by a processor, cause the processor to perform a method, using an apparatus, for designing a magnetic plate allowing magnetic particles contained in magnetic ink within a printing layer disposed on the magnetic plate to be distributed at different densities depending on magnetic force intensity of the magnetic plate, the method comprising:
    estimating a distribution of the magnetic particles allowing magnetic ink to be spread;
    estimating forms of magnetic field applying the magnetic force to the magnetic particles in order for the magnetic ink to be spread in a desired magnetic pattern within the printing layer;
    obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate; and
    obtaining a parameter for the magnetic plate configured to form the magnetic printing pattern based on the obtained adjustment factors.

7. An apparatus for designing a magnetic plate allowing magnetic particles contained in magnetic ink within a printing layer disposed on the magnetic plate to be distributed at different densities depending on magnetic force intensity of the magnetic plate, comprising:
    a memory storing computer executable instructions and a processor configured to execute the computer executable instructions stored the memory in order to perform a method for designing the magnetic plate allowing magnetic particles, the method including:
    receiving information regarding a desired magnetic printing pattern to which the magnetic ink is formed;
    estimating a distribution of the magnetic particles allowing the magnetic ink to be spread;

estimating forms of magnetic field applying the magnetic force to the magnetic particles in order for the magnetic ink to be spread in the desired magnetic printing pattern within the printing layer;

obtaining adjustment factors of the magnetic plate corresponding to the estimated forms of the magnetic field by using a model for which deep learning or machine learning has been performed using design conditions including at least one of an upper surface structure of the magnetic plate and a magnetization property of the magnetic plate;

obtaining a parameter for the magnetic plate configured to form the magnetic printing pattern based on the obtained adjustment factors.

* * * * *